United States Patent [19]

Garscadden et al.

[11] 4,274,065
[45] Jun. 16, 1981

[54] CLOSED CYCLE ANNULAR-RETURN GAS FLOW ELECTRICAL DISCHARGE LASER

[75] Inventors: Alan Garscadden, Yellow Springs; Peter Bletzinger, Fairborn; Siegfried H. Hasinger; Robert A. Olson, both of Kettering; Benjamin Sarka, Enon, all of Ohio

[73] Assignee: The United States of America as represented by the Secretary of the Air Force, Washington, D.C.

[21] Appl. No.: 62,591

[22] Filed: Jul. 31, 1979

[51] Int. Cl.³ .............................................. H01S 3/03
[52] U.S. Cl. .............................................. 331/94.5 G
[58] Field of Search ..................... 331/94.5 G, 94.5 P, 331/94.5 PE

[56] References Cited
PUBLICATIONS

"High-Repetition-Rate Closed-Cycle Rare Gas Electrical Discharge Laser", by Olson; *Rev. Sc., Inst.* vol. 47, No. 6, Jun. 76.

*Primary Examiner*—Stanley D. Miller, Jr.
*Assistant Examiner*—Leon Scott
*Attorney, Agent, or Firm*—Donald J. Singer; Thomas L. Kundert

[57] ABSTRACT

A closed cycle, high repetition pulsed laser having a laser flow channel with an annular flow return surrounding the laser flow channel. Ultra high vacuum components and low out-gassing materials are used in the device. An externally driven axial flow fan is used for gas recirculation. A thyratron-switched low-inductance energy storage capacitor is used to provide a transverse discharge between profiled electrodes in the laser cavity.

4 Claims, 2 Drawing Figures

CLOSED CYCLE ANNULAR-RETURN GAS FLOW ELECTRICAL DISCHARGE LASER

RIGHTS OF THE GOVERNMENT

The invention described herein may be manufactured and used by or for the Government of the United States for all governmental purposes without the payment of any royalty.

BACKGROUND OF THE INVENTION

This invention relates to a closed cycle flowing gas electrical discharge laser.

The patents to Foster et al, U.S. Pat. No. 3,772,610; Ruby et al, U.S. Pat. No. 3,886,477; Levatter et al, U.S. Pat. No. 4,005,374; and Freiberg et al, U.S. Pat. No. 4,031,484, relate to continuous flow type lasers. A closed-cycle laser is disclosed in the article, "High-Repetition-Rate Closed-Cycle Rare Gas Electrical Discharge Laser" by Olson et al, Review of Scientific Instruments Volume 47, No. 6, June 1976.

In prior art systems the advantages of fast flow in closed-cycle systems could not be realized without cumbersome and physically large systems.

BRIEF SUMMARY OF THE INVENTION

According to this invention a high repetition rate pulsed and fast-transverse flow laser is provided in a closed cycle system. An extremely compact closed cycle system is achieved by utilizing an annular flow-return surrounding the laser flow channel. The laser is constructed of ultra high vaccum components and low outgassing materials to ensure minimum contamination of the laser gas. Contamination by the mechanical drive required for gas recirculation is avoided by employing an axial flow fan externally driven through a rotary vaccum seal. A pulsed transverse discharge is established between profiled electrodes by means of a thyraton switched low-inductance energy storage capacitor. A laser optical cavity is established perpendicular to the discharge and gas flow axes.

IN THE DRAWINGS

Figure 1:
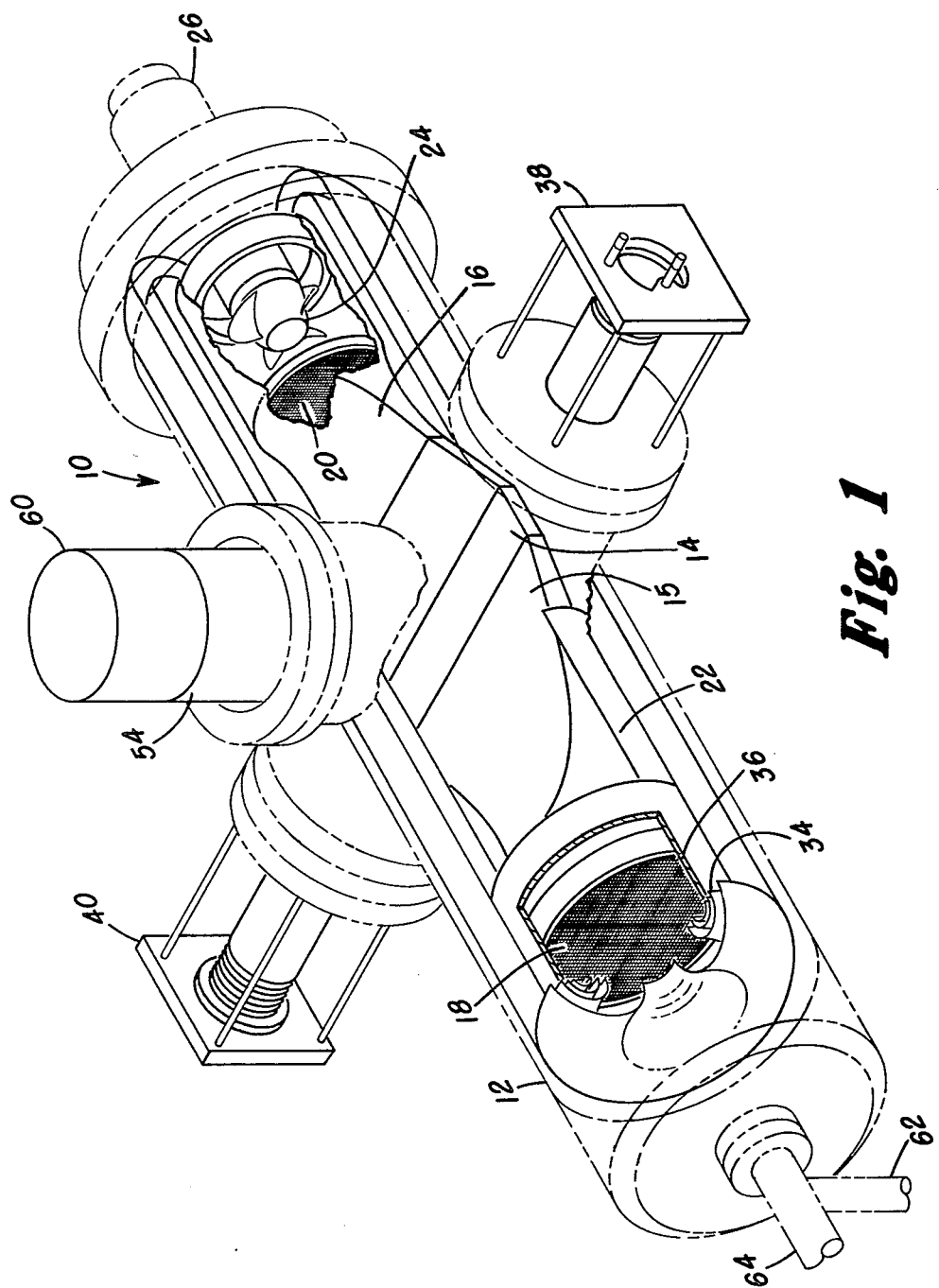
FIG. 1 is a partially schematic isometric view of a closed-cycle laser according to the invention.
Figure 2:
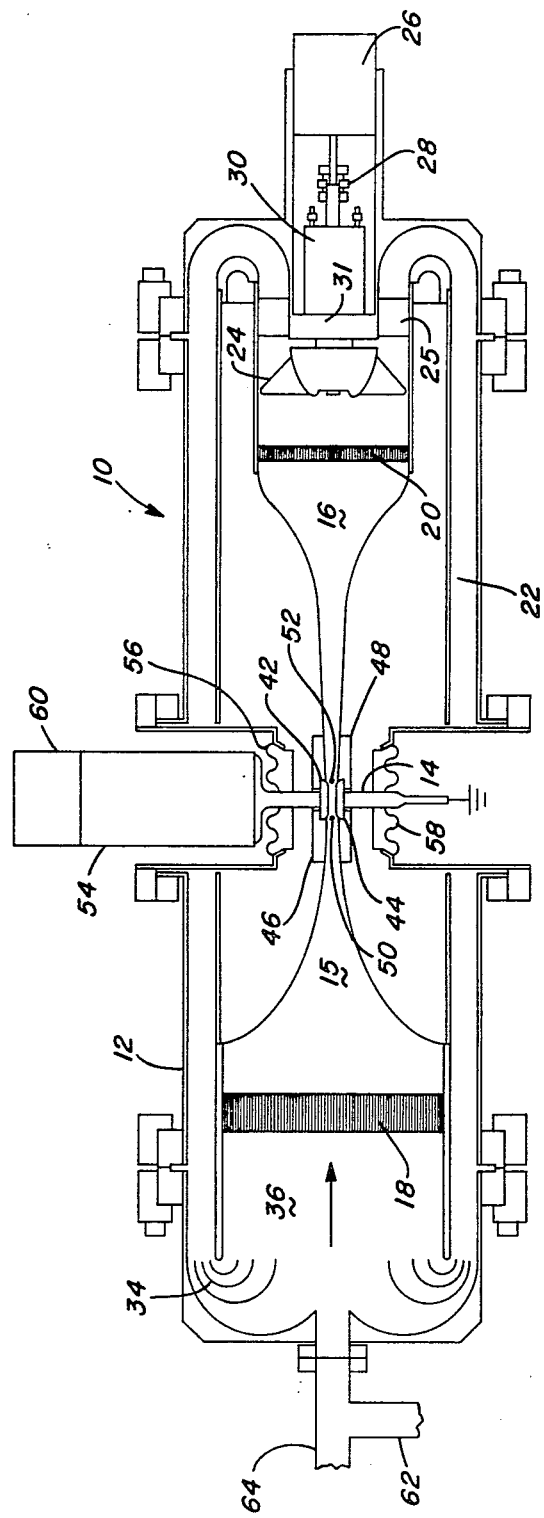
FIG. 2 is a partially schematic view of the device of FIG. 1 along a plane perpendicular to the axis of the optical cavity and through the center of the gas flow channel.

Reference is now made to FIGS. 1 and 2 of the drawing which show a closed-cycle gas laser 10 within a hermetically sealed envelope 12. The laser 10 includes a laser flow channel 14 with a converging inlet 15 and an exit diffuser 16. A honeycomb structure 18 is provided in the inlet to remove swirl and lateral velocities from the gas flow. A similar honeycomb structure 20 is provided in the diffuser exit. An annular flow-return channel 22 surrounds the laser channel. An axial flow fan 24 provides gas recirculation through the flow return channel 22 and laser channel 14. Stator vanes 25 are connected in the inlet to the flow-return channel adjacent fan 24. The fan is driven by an electric motor 26 through a flexible coupling 28 and a rotary seal 30, sealed into the bulkhead 31 such as by heliarc welding. Flow turning vanes 34 are provided between the flow-return channel 22 and a settling chamber 36. An optical cavity is established perpendicular to the flow through channel 14 between conventional laser mirrors, supported in conventional mirror mounts 28 and 40. Uniform field electrodes 42 and 44 are mounted on flat glass plates 46 and 48. Preionization wires 50 and 52 are positioned at the electrode midplane along the length of electrodes 42 and 44 on the upstream and downstream sides.

A thyratron switched low-inductance energy storage capacitor 54 is connected to the electrodes 42 and 44 through low inductance, high voltage, high vaccum feedthrough elements 56 and 58. A high repetition rate pulser circuit, which may be used with the laser, is shown in FIG. 7 of the Olson et al article. Rogowski-profile electrodes can be used for electrodes 42 and 44 and tungsten preionization wires can be used as in the device of the Olsen et al article.

The gas laser is constructed of high vacuum components and is preferably made of low outgassing materials to ensure minimum contamination of the laser gases.

In a device constructed the envelope 12, the flow-return 22, the inlet 15, the diffuser 16, the settling chamber 36, honeycomb structures 18 and 20, and vanes 34 were made of stainless steel. Copper seals were used in the envelope joints. The feed through elements 56 and 58 were made of alumina and the mounting plates 46 and 48 were made of Pyrex. The rotary seal 30 used was a ferrofluidic seal SB-500 A-W-072 made by Ferrofluidics Corp. In a device constructed the thyratron was mounted on top of the capacitor 54 as shown at 60. A 400 Hz motor was used to drive the axial flow fan 24. Helium-Xenon and Argon-Xenon have been used in devices constructed; however any laser gas normally used in electrical discharge lasers could be used. Under some operating conditions a cooling heat exchanger, not shown, may be required around the envelope 12.

In the operation of the device the gas laser is first outgased by heating and pumping, to a vacuum of approximately $10^{-9}$ Torr after bake out. A pump valve connected in conduit line 62 is then closed and the device is filled with a laser gas such as a Helium-Xenon mixture through conduit 64 up to 1 atmosphere or higher. The electronic control system is then turned on with about a 15 minute warm up time being allowed for the thyratron. The circuit is then adjusted in a conventional manner to provide the desired pulse repetition frequency and the desired charge voltage for the energy storage capacitor. The fan motor is then turned on and adjusted to the desired speed. The pulser is then activated.

The annular return system has been found to provide improved flow with lower pressure drops, higher flow velocities and more uniform flow than prior art systems. Flow velocities up to 275 ft/sec. in the discharge region have been achieved. Tests have been made demonstrating high pulse repetition rates up to 12 KHz with an average power of 3.0 watts lasing at 2.03, 2.65, 3.43, 3.65 and 5.13 microns simultaneously. Pulse width of lasing was approximately 5 microseconds.

While a pulsed laser has been described, the device could also be used as a CW laser.

There is thus provided a compact closed-cycle, high repetition rate pulsed laser capable of long lifetime performance on a single gas fill which requires minimum maintenance and provides low cost operation.

We claim:

1. An electrical discharge laser, comprising: a hermetically sealed envelope; a laser flow channel within said envelope; a gas mixture in said laser flow channel;

means for providing a high velocity uniform flow of said gas mixture through said laser flow channel; means for producing an electric discharge in said gas mixture; and an optical resonant cavity having a optical axis perpendicular to said laser flow channel; said optical resonant cavity having laser mirror means for directing the optical axis through said electric discharge and removing optical energy generated by said electric discharge in said gas mixture; said means for providing a high velocity uniform flow of gas mixture through the laser flow channel including means for providing an annular gas flow return path surrounding the laser flow channel.

2. The device as recited in claim 1 wherein said means for providing a high velocity uniform flow of gas mixture through the laser flow channel includes a settling chamber positioned within and coaxial with said annular gas flow return path; means for directing the flow from said annular gas flow return path through said settling chamber; a converging laser flow channel inlet connected between said settling chamber and said laser flow channel; an axial flow fan connected between the laser flow channel and said annular return path; means outside of said envelope for driving said fan; means mounted on said envelope for connecting said driving means to said fan; and a diffuser channel connected in the gas flow outlet of the laser flow channel.

3. The device as recited in claim 2 including means, between the settling chamber and the laser flow channel inlet for removing swirl and lateral velocities from the gas flow and means in the outlet of said diffuser for removing swirl and lateral velocities from the gas flow.

4. The device as recited in claim 3 wherein said means for producing an electric discharge in the gas mixture includes means for pulsing the discharge at a predetermined pulse repetition rate.

* * * * *